United States Patent

[11] 3,626,490

| [72] | Inventor | Heinz Rausch<br>Basel, Switzerland |
| --- | --- | --- |
| [21] | Appl. No. | 5,584 |
| [22] | Filed | Jan. 26, 1970 |
| [45] | Patented | Dec. 7, 1971 |
| [73] | Assignee | Elektro-Apparatebau F. Knobel & Co.<br>Ennenda, Glarus, Switzerland |
| [32] | Priority | Jan. 24, 1969 |
| [33] | | France |
| [31] | | 6901409 |

[54] LIQUID METERING APPARATUS
5 Claims, 2 Drawing Figs.

[52] U.S. Cl. .................................................. 222/334,
222/355, 91/465, 91/469
[51] Int. Cl. ...................................................... G01f 11/06
[50] Field of Search ........................................... 222/55,
334, 335; 91/465, 469

[56] References Cited
UNITED STATES PATENTS

| 3,337,002 | 8/1967 | Page .............................. | 222/334 X |
| 3,341,076 | 9/1967 | Wasilewski ................. | 222/334 X |
| 3,353,712 | 11/1967 | Prescott ...................... | 222/335 X |

*Primary Examiner*—Robert B. Reeves
*Assistant Examiner*—Thomas E. Kocovsky
*Attorney*—Werner W. Kleeman ABSTRACT: A liquid metering apparatus, particularly for distribution of beverages, comprises a metering or dosing container in which a metering piston is reciprocating, and a reversing valve controlling the filling and draining of the metering container. Actuation of the reversing valve and movement of the metering piston for draining the metering container is effected by means of an auxiliary medium controlled by an auxiliary magnetic control valve.

LIQUID METERING APPARATUS

The invention relates to a liquid metering apparatus of the kind having a metering container with a piston movable therein and a reversing valve for controlling the filling and draining of the metering container. Such metering apparatus having a metering container and a metering piston offer the advantage, with respect to metering valves in which the metered volume is dependent on the opening period of a valve, that the metered volume is independent of the viscosity of the liquid and can be exactly regulated.

According to the invention the liquid metering apparatus of the above type comprises an auxiliary magnetic control valve for controlling an auxiliary medium, and means actuated by said auxiliary medium for operation of said reversing valve and moving said metering piston for draining the metering container.

In order to be able to easily vary the volume to be metered, the filling position of the metering piston in the metering container is defined by a fine adjustment member forming an abutment for the metering piston, and coarse adjustment blocks are adapted to be placed on said fine adjustment member. The fine adjustment member and the coarse adjustment blocks are so dimensioned that the variation of volume of the metering container obtainable by the fine adjustment member corresponds at least to the variation obtained by one coarse adjustment block.

The accompanying drawings show by way of example a liquid metering apparatus according to the invention.

Figure 1:
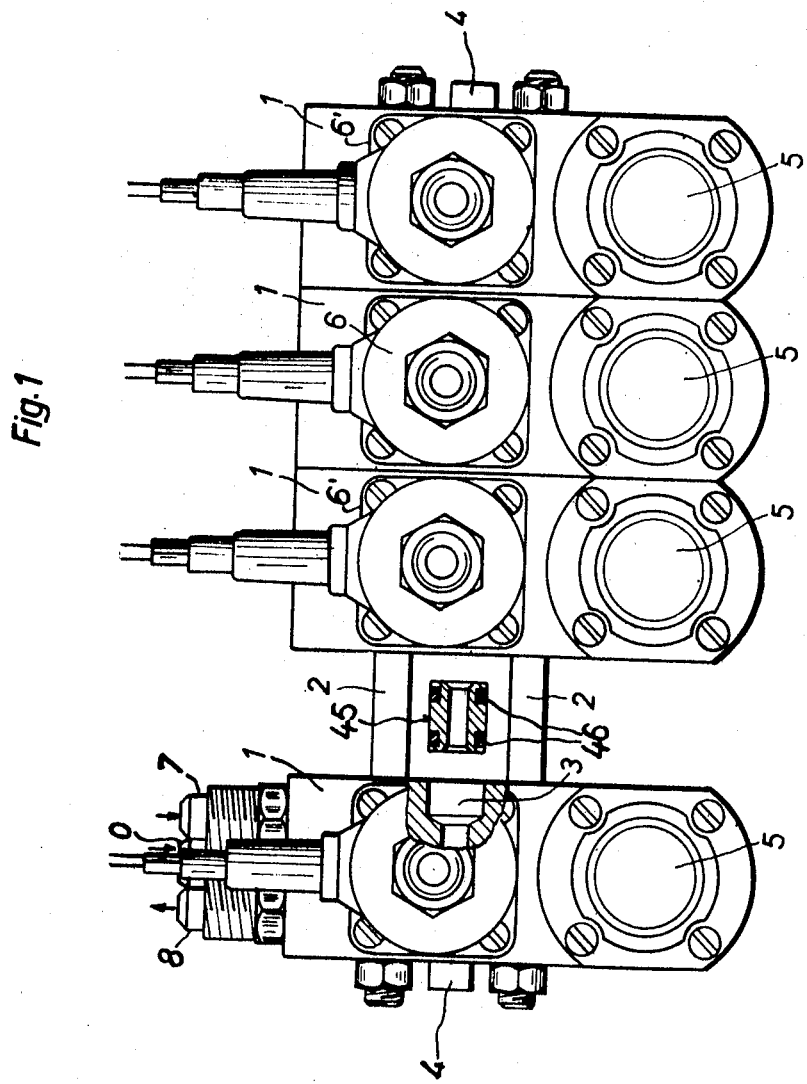
FIG. 1 shows a plurality of metering devices combined to a single block.

According to FIG. 1 several metering or dosing devices 1 are united to a block and held together by two screw bolts 2. This block can be permanently built into a conduit system or secured by means of flanges attached to both ends of the block within a cabinet. A pipe connection 0 for a feed conduct of an auxiliary medium is provided on one of the metering devices 1 and all metering devices 1 are provided with a transverse bore 3, the different transverse bores communicating with each other at the joining sidewalls of the metering devices, so that the auxiliary medium supplied by a common single feed connection 0 arrives at all metering devices 1. At the first and at the last metering device 1 of a block the transverse bore 3 is closed by a closure plug 4. In FIG. 1 the first metering device of the block has been shown in laterally removed position to show an annular sealing member 45 provided with two sealing rings 46. This member 45 engages in the transverse bores 3 of two adjacent metering devices 1 to prevent leakage of auxiliary medium at the joining lateral faces of adjacent metering devices. An auxiliary magnetic control valve 6 is screwed by means of a flange 6' to each dosing device 1. Each device 1 further comprises a regulating member 5 for fine adjustment of the dosing volume, a pipe connection 7 for connecting a supply tube for liquid to be metered, and a discharge pipe connection 8 for connecting a tube leading to a consumer. The supply and discharge connections are symmetrically arranged with respect to the longitudinal median plane of a metering device 1, and so that when the pipe connections have to be removed, the plurality of metering devices 1 united to a block do not have to be dismantled.

Figure 2:
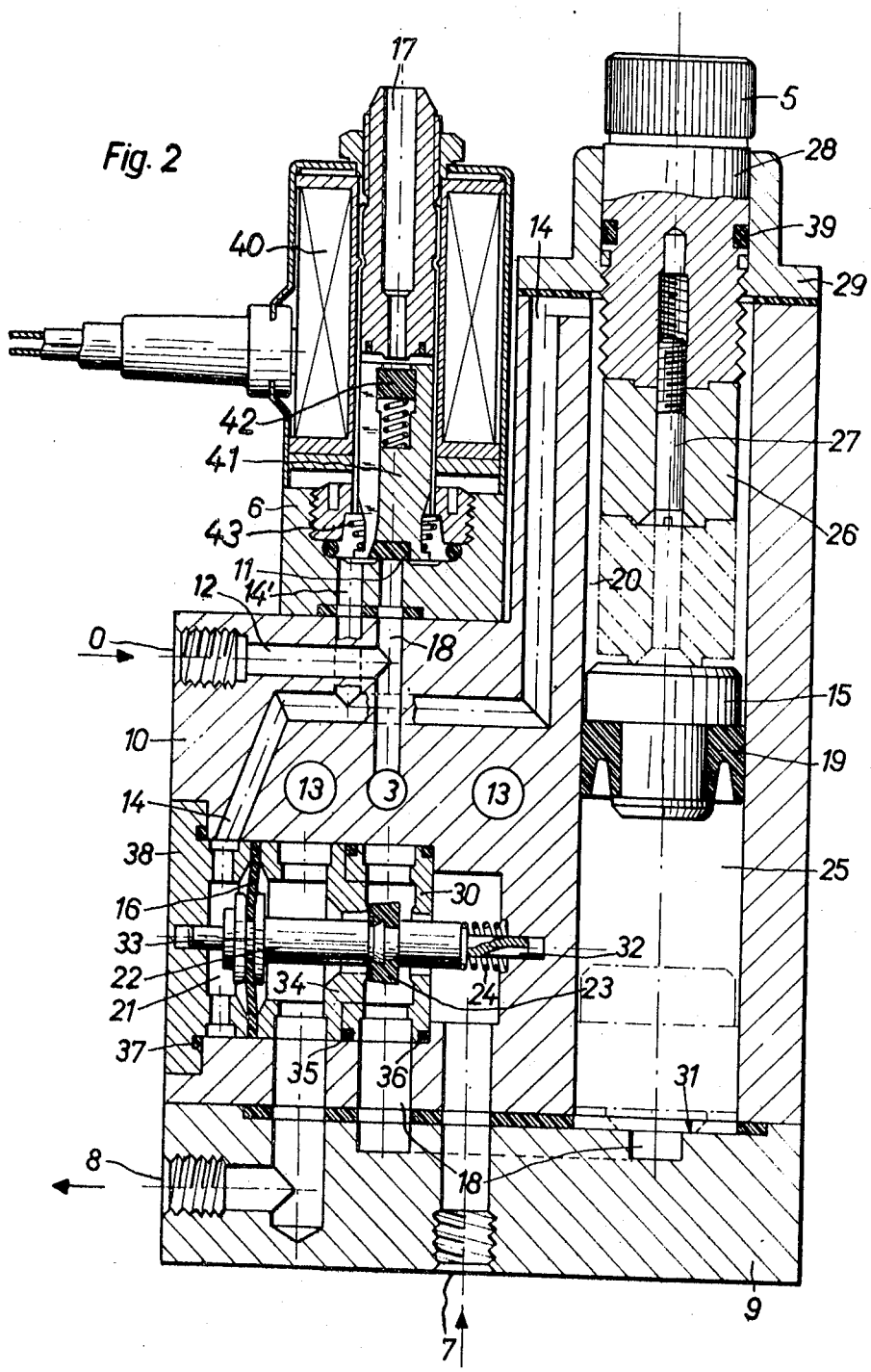
FIG. 2 is a view in longitudinal section of a metering device with an auxiliary magnetic control valve.

In FIG. 2, the supply pipe connection 7 and the discharge connection 8 are shown arranged on two different sides of a connecting plate 9 for better understanding, while in reality the connections 7 and 8 are on the same face of the plate 9 as shown in FIG. 1. The connecting plate 9 is secured by screws (not shown) to the casing or housing 10 of the metering device. The feed conduit connection 0 of the auxiliary medium is connected with a duct 18 in the casing 10, this duct extending from the transverse bore 3 to a control seat 11. The bores 13 in the casing 10 serve for the passage of the bolts 2 (FIG. 1) for assembling the various metering devices 1 to a block. A duct 14 in the casing 10 extends from one side 20 of a metering piston 15 to one side 21 of a diaphragm 16 and communicates by a duct 14' with the magnetic valve 6. A duct 17 in the magnetic control valve 6 serves for venting the auxiliary medium on the side 20 of the piston 15 and the side 21 of the diaphragm 16 in the represented position of the valve 6. This valve accordingly, as is visible, is a valve having three controlled exits and two positions, i.e. a so-called 3/2-way valve. The dosing piston 15 is movable within a dosing cylinder 25 and provided with a packing sleeve 19. In its upper end position, the piston 15 abuts against a coarse abutment block 26 secured by means of a screw 27 to a regulating screw 28 which is screwed into an annular flange 29 fixed to the casing 10, a gasket 39 preventing any leakage of auxiliary medium. In its lower end position, the piston 15 abuts against a stop 31. A valve stem 22 of the reversing valve is connected to the diaphragm 16. The valve stem 22 carries a valve body 23 made of rubber and cooperating with two valve seats 30 and 34. A compression spring 24 tends to urge the valve stem 22 to the end position represented in FIG. 2 in which the valve body 23 abuts against the valve seat 34. The ends 32 and 33 of the valve stem are centrically guided, in order to ascertain a perfect seal at the valve seats 30 and 34. The valve seats 30, 34 and the cover plate 38 closing the space 21 at the rear of the diaphragm 16 are sealed with respect to the casing 10 by gaskets 36, 35 and 37.

In the end position of the valve stem 22 shown in FIG. 2, in which the space 21 at the rear of the diaphragm 16 is vented by the outlet duct 17 of the magnetic valve 6, the liquid to be metered entering through the supply connection 7 flows via duct 18 into the bottom of the metering cylinder 25 and moves the piston 15 upward until it abuts against the coarse adjustment block 26 fixed to the regulating screw 28. During this movement, the packing sleeve 19 prevents liquid from arriving in the space 20 destined for the auxiliary medium. When the piston 15 is in its upper end position, the metering cylinder 25 contains a precisely defined volume of liquid. A coarse adjustment of this volume can be effected, if necessary, by fixing a second block 26, as shown in dash and dot lines, or more than two blocks, to the regulating screw 28; these blocks may be of different sizes. The fine adjustment of the volume can be effected by turning the screw 28. The blocks 26 can have such a size that the change of volume which can be effected by the fine adjustment screw corresponds at least to the change of volume obtained by one coarse adjustment block. The pitch of the screw 28 can be so chosen that one revolution of the screw corresponds to an exactly defined change of volume. Turning of the screw can be effected by hand or by a screwdriver.

When tension or voltage is applied to the solenoid 40, the armature 41 is raised and the exit duct 17 is closed by the packing 42, while the control seat 11 is opened, so that auxiliary medium from the supply conduit connection 0 flows through ducts 18, 14' and 14 into the space 21 at the rear of the diaphragm 16 and into the space 20 above the dosing piston 16. Owing to the action of the auxiliary medium on the diaphragm 16 the valve stem 22 is moved towards the right in FIG. 2, so that the valve seat 30 is closed and the valve seat 34 is opened by the valve body 23. The pressure of the auxiliary medium in the space 20 moves the dosing piston 15 downward which thus discharges the liquid in the metering cylinder 25 through the duct 18 and the valve seat 34 to the discharge 8 until the piston 15 has reached the stop 31. This end position of the piston is retained so long as the magnetic control valve 6 remains under tension. When the circuit of the solenoid 40 is interrupted, the armature 41 moves downward by the action of a spring 43 and the admission of auxiliary medium is shut down at the control seat 11; the space 21 at the rear of the diaphragm 16 and the space 20 above the dosing piston 15 are relieved through the ducts 14, 14' and 17, so that the reversing valve 22, 23, returns into the starting position shown in FIG. 2 and the metering piston 15 again is moved upwardly by the liquid fed through the supply connection 0 until it abuts against the coarse adjustment block 26.

While there is shown and described present preferred embodiments of the invention, it is to be distinctly understood that the invention is not limited thereto but may be otherwise variously embodied and practiced within the scope of the following claims.

I claim:

1. Liquid metering apparatus having a metering container, a metering piston movable in the container and a reversing valve for controlling the filling and draining of the metering container, wherein the improvement comprises an auxiliary magnetic control valve for controlling an auxiliary medium, said auxiliary magnetic control valve providing a common valve unit for controlling both said reversing valve and said metering piston, and means actuated by said auxiliary medium for operation of said reversing valve and moving said metering piston for draining said metering container, said actuated means embodying control conduit means in flow communication with said auxiliary magnetic control valve and with both said reversing valve and said metering container to selectively permit either venting of said reversing valve and said metering container or delivery of said auxiliary medium to both said reversing valve and said metering container.

2. Apparatus according to claim 1, wherein the filling position of said metering piston in the metering container is defined by a fine adjustment member forming an abutment for the metering piston, and coarse adjustment blocks adapted to be placed on said fine adjustment member.

3. Apparatus according to claim 2, wherein the fine adjustment member and the coarse adjustment blocks serve to selectively vary the effective volume of the metering container and are so dimensioned with respect to one another that the variation in the volume of the metering container obtainable by the fine adjustment member corresponds at least to the variation in the volume of the metering container which can be obtained by one coarse adjustment block.

4. Apparatus according to claim 1, wherein said metering container and reversing valve are mounted in a casing provided with a transverse bore traversing the casing from side to side for the passage of said auxiliary medium, in order to provide auxiliary medium from a common supply connection to a plurality of metering containers combined to a common block.

5. Apparatus according to claim 4, wherein the supply and discharge connections of the liquid being metered and the connection of the auxiliary medium are arranged on an end face of said casing, so that when a plurality of metering containers are combined to a block, the supply and discharge connections can be mounted and dismantled without demounting the casings of the metering containers and reversing valves.

* * * * *